(12) United States Patent
Sharif et al.

(10) Patent No.: US 11,689,487 B1
(45) Date of Patent: Jun. 27, 2023

(54) SYSTEM AND METHOD FOR IDENTIFYING AND BLOCKING TROLLS ON SOCIAL NETWORKS

(71) Applicant: @PrayerGroup, LLC, Menlo Park, CA (US)

(72) Inventors: Amir Sharif, Menlo Park, CA (US); Nicholas Brailas, San Jose, CA (US); Reynold Wong, San Jose, CA (US); Brent La Sala, Santa Barbara, CA (US)

(73) Assignee: Kynami, Inc., Palo Alto, CA (US)

( * ) Notice: Subject to any disclaimer, the term of this patent is extended or adjusted under 35 U.S.C. 154(b) by 0 days.

(21) Appl. No.: 17/376,800

(22) Filed: Jul. 15, 2021

Related U.S. Application Data

(60) Provisional application No. 63/052,629, filed on Jul. 16, 2020.

(51) Int. Cl.
| | |
|---|---|
| G06F 15/16 | (2006.01) |
| H04L 51/212 | (2022.01) |
| G06Q 50/00 | (2012.01) |
| H04L 51/52 | (2022.01) |
| H04L 67/133 | (2022.01) |

(52) U.S. Cl.
CPC ........... *H04L 51/212* (2022.05); *G06Q 50/01* (2013.01); *H04L 51/52* (2022.05); *H04L 67/133* (2022.05)

(58) Field of Classification Search
CPC ..... H04L 51/212; H04L 67/133; H04L 51/52; G06Q 50/01
USPC .................................. 709/206, 204, 217, 227
See application file for complete search history.

(56) References Cited

U.S. PATENT DOCUMENTS

| | | | | |
|---|---|---|---|---|
| 7,185,065 | B1* | 2/2007 | Holtzman | G06Q 50/01 |
| | | | | 709/217 |
| 7,941,382 | B2* | 5/2011 | Stokes | G06F 15/16 |
| | | | | 706/20 |
| 8,347,381 | B1* | 1/2013 | Gauvin | G06Q 50/01 |
| | | | | 726/25 |
| 8,997,240 | B1* | 3/2015 | Kohen | G06F 21/31 |
| | | | | 713/182 |
| 2009/0177744 | A1* | 7/2009 | Marlow | G06Q 10/10 |
| | | | | 709/204 |
| 2010/0223581 | A1* | 9/2010 | Manolescu | G06Q 10/10 |
| | | | | 707/E17.046 |
| 2011/0113086 | A1* | 5/2011 | Long | G06Q 10/10 |
| | | | | 709/224 |
| 2012/0304249 | A1* | 11/2012 | Luo | H04L 63/0263 |
| | | | | 726/1 |
| 2012/0324023 | A1* | 12/2012 | Di Sciullo | G06Q 40/06 |
| | | | | 709/206 |
| 2013/0031489 | A1* | 1/2013 | Gubin | G06Q 10/10 |
| | | | | 715/753 |

(Continued)

*Primary Examiner* — Kaylee J Huang
(74) *Attorney, Agent, or Firm* — Bardmesser Law Group

(57) ABSTRACT

A system for identifying and blocking trolls on social networks includes an identifier module that continuously scans a social media platform (SMP) to detect that a user of the SMP is a troll; a monitor module that includes a list of definitions against which the troll's fingerprints are matched; a grader module that assigns a trollness grade to the troll; a delimiter module that injects UXRs (user experience retardants) through an Application Programming Interface of the SMP based on the trollness grade from the grade module; and a retardant library that includes a list of human-defined UXRs.

16 Claims, 4 Drawing Sheets

(56) References Cited

U.S. PATENT DOCUMENTS

| | | | | |
|---|---|---|---|---|
| 2013/0103768 A1* | 4/2013 | Freebeck | ............... | H04L 51/56 |
| | | | | 709/204 |
| 2013/0262320 A1* | 10/2013 | Makanawala | ........... | H04L 51/52 |
| | | | | 705/304 |
| 2014/0304343 A1* | 10/2014 | Skiba | ................... | H04L 51/046 |
| | | | | 709/206 |
| 2014/0317744 A1* | 10/2014 | Turgeman | ........... | H04W 12/122 |
| | | | | 726/23 |
| 2015/0033155 A1* | 1/2015 | Camacho | ............... | H04L 51/52 |
| | | | | 715/758 |
| 2019/0190934 A1* | 6/2019 | Peppe | .................. | G06F 21/552 |
| 2019/0244174 A1* | 8/2019 | Ogrinz | ................... | H04L 51/04 |
| 2021/0409517 A1* | 12/2021 | Luo | ...................... | G06F 3/0482 |

\* cited by examiner

Healthy Link Acceleration Profiles

Example of an Unhealthy Link Acceleration Profile

SYSTEM AND METHOD FOR IDENTIFYING AND BLOCKING TROLLS ON SOCIAL NETWORKS

Cross reference to related applications

This application is a non-provisional of US Provisional Patent Application No. 63/052,629, filed on Jul. 16, 2020.

BACKGROUND OF THE INVENTION

Field of the Invention

The invention relates to social networks, and, more particularly, to identifying and dealing with trolls in a social network environment.

Description of the Related Art

Many users of social networks (or, more broadly, social groups) have experienced a phenomenon where the social group was doing well until some person joined the group and became a catalyst for tearing social bonds apart. In any social group, an agent-provocateur can come in and poison the well for the rest of the group. In modern parlance, such an individual is often referred to as a "troll".

Social media platforms typically deal with trolls by throwing the book at them (terms of use violation), and throwing them off of the platform, in a manual process. That negative interaction often becomes useful propaganda for the troll that can harm the social media platform. Additionally, it involves manual intervention by someone working for the social network, which many social networks would prefer to automate.

SUMMARY OF THE INVENTION

Accordingly, the present invention is related to a system for handling trolls in a social network environment that substantially obviates one or more of the disadvantages of the related art.

In one aspect, a system for identifying and blocking trolls on social networks includes an identifier module that continuously scans a social media platform (SMP) to detect that a user of the SMP is a troll; a monitor module that includes a list of definitions against which the troll's fingerprints are matched; a grader module that assigns a trollness grade to the troll; a delimiter module that injects UXRs (user experience retardants) through an Application Programming Interface of the SMP based on the trollness grade from the grade module; and a retardant library that includes a list of human-defined UXRs.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Figure 1:
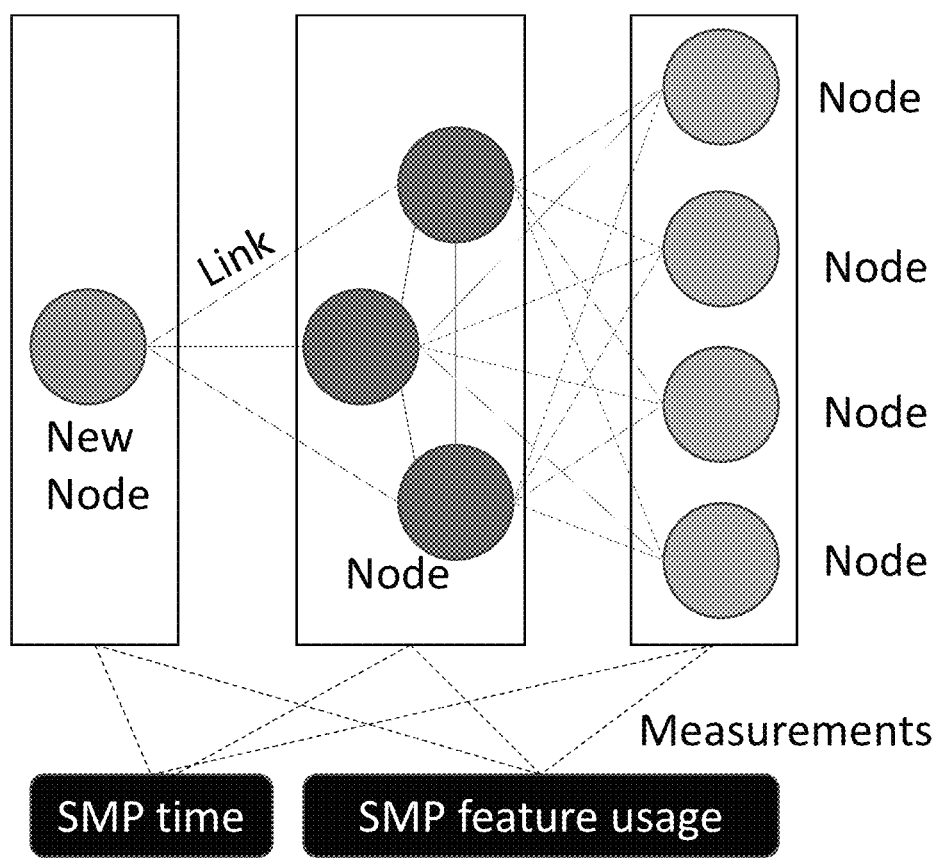
FIG. 1 shows the addition of a new node (user) to a social media platform.
Figure 2:
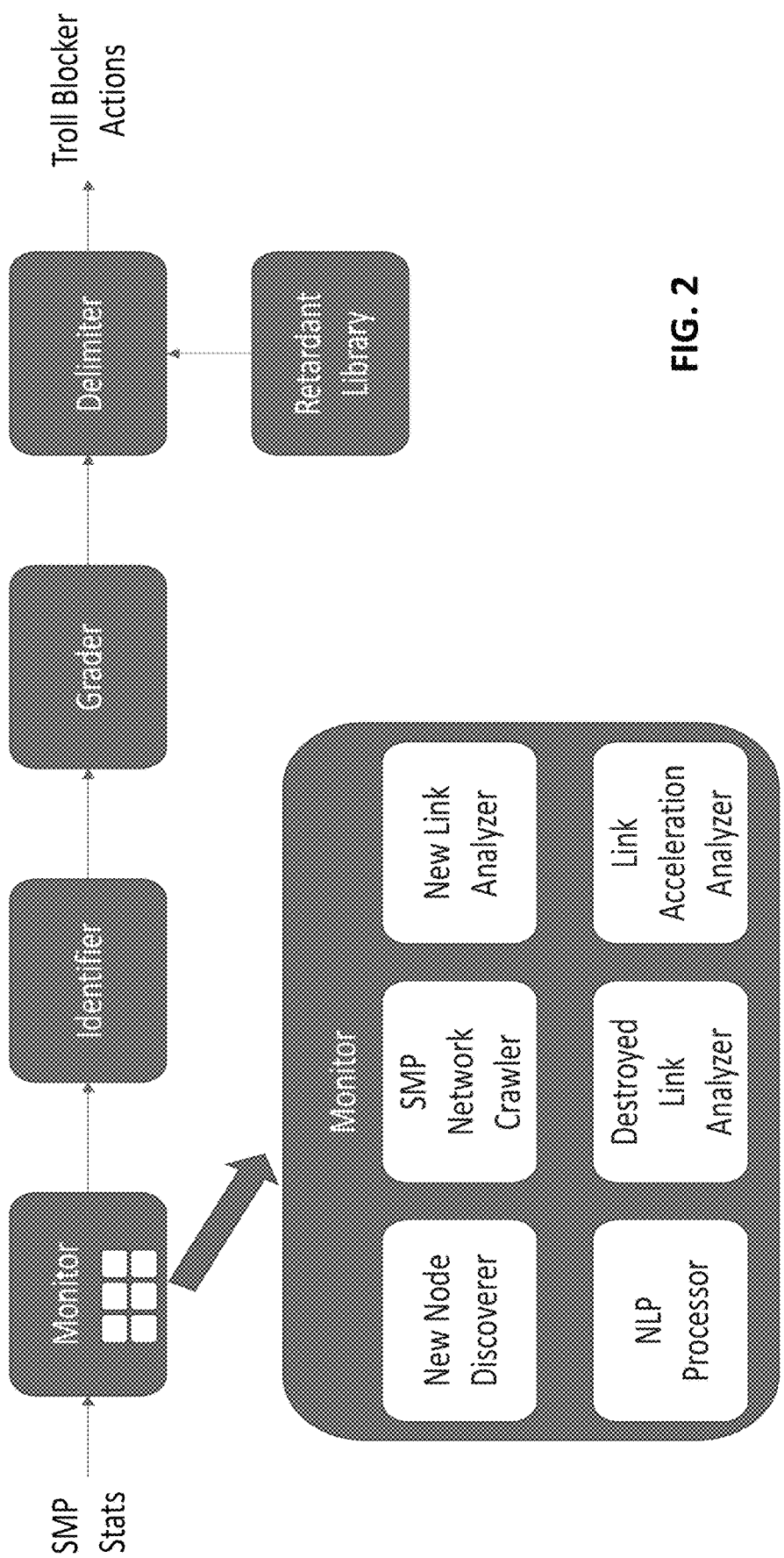
FIG. 2 shows the various components of the proposed system.

Reference will now be made in detail to the preferred embodiments of the present invention, examples of which are illustrated in the accompanying drawings.

Trolls can be fingerprinted through two mechanisms. First, their direct social interactions often follow certain patterns, which can be recognized. Second, the interaction of those who are connected with them on the social media platform alters and starts to display certain patterns in two distinct dimensions: with the platform itself and with those that they interact with on the platform.

Once a troll is fingerprinted and identified, the social media platform has the incentive to kick him off. But, instead of throwing the book at him, the social media platform (SMP) could invoke the Troll Blocker Protocol (TBP).

TBP is a method for automatically and progressively ruining the SMP's experience to the degree that the troll would voluntarily drop off of the platform.

TBP system is comprised of the following subsystems, which are typically implemented as software modules running on a processor:

1. The Identifier
2. The Monitor
3. The Grader
4. The Delimiter
5. Retardant Library The function of the Monitor is to continuously scan the social media platform (SMP) to discover trolls. A "troll" is an object that is defined by the Identifier.

The Monitor and the Identifier work in conjunction with the Grader, where monitored activity and identified troll is ranked by the Grader on a scale of 1 to N.

With the Troll identified, monitored, and graded along a gradient, the Delimiter completes the cycle by introducing the social media platform user experience retardants (UXRs) from the Retardant Library in proportion to the grade from the Grader. As the Troll's Grader score rises, the Delimiter dishes out more severe UXRs. Inversely, if a Troll's Grader score falls, the Delimiter dishes out less severed UXRs.

The Monitor

The Monitor's function is to constantly scan the social media platform and measure different social media platform attributes:

1. SMP new entrants (New Node)
2. New Nodes communications (Links) with existing SMP members (Nodes)
3. The intra-Links between Nodes that are connected with the New Node 4. The links between Nodes that are connected with the New Node and Nodes that are not connected with the New Node
5. Link sentiment
6. New Node SMP time
7. New Node SMP feature usage
8. Node SMP time
9. Node SMP feature usage The components of the Monitor are:
A. A New Node discovery mechanism
B. An SMP social media crawler to discover first and second corder connections to the New Node
C. A new Link discovery mechanism
D. A destroyed Link discovery mechanism
E. Link acceleration analysis mechanism, where the speed of change for communication flows are measured.
F. A Natural Language Processor that measures Link (conversation) sentiment.

Figure 3:
FIG. 3 shows behavioral patterns for healthy (normal) users vs. trolls.
Figure 3:
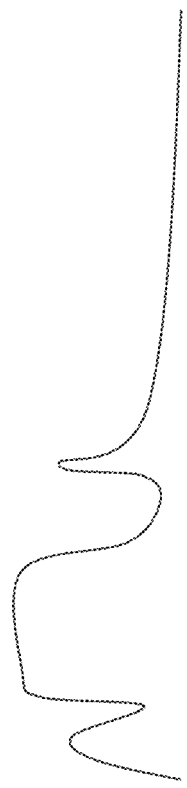

When a New Node appears, the Monitor establishes a database for that New Node. From that point forth, the Monitor looks for the following patterns as made possible by its components:

1. What new Links were established between the New Node and existing Nodes? There are three methods for tracking this change: (1) monitor the joint groups between the New Node and existing Nodes; (2) monitor messages sent between the New Node and existing Nodes within common groups; and (3) monitor direct messages between the New Node and existing Nodes within the confines of the SMP.
2. What is the Link acceleration pattern; specifically, at what rate communications between the New Node and Nodes happen, and what is their growth rate? A healthy dialog pattern follows a slow ramp up pattern and falls into a steady, flat line with no or little acceleration (positive or negative growth in the rate of communications). An unhealthy communication pattern shows rapid acceleration patterns with quick spikes (many Links established in a short time period) and rapid fall offs (Links are destroyed). The Troll Blocker Protocol looks for unhealthy communication patterns based on acceleration rates. See FIG. 3.
3. Which Links are destroyed (all communications cease) between New Node and other Nodes? The method for monitoring destroyed Links is through monitoring erstwhile common groups between the New Node and existing Nodes—i.e., either the New Node or the existing Node leaves a shared group; or Links between the New Node and an existing Nodes drops to zero (communications cease). Links dropping to zero could be either because of lack of interactions in a joint group or cease of direct messaging on the SMP.
4. What inter-Links are established between Nodes that are directly connected with New Node? This is achieved by monitoring the Links between all Nodes that are directly connected with the New Node. Links are formed either by Nodes joining new common groups or through new conversation streams, either within a group or through direct messaging on the SMP.
5. What inter-Links are destroyed between Nodes that are directly connected with New Node? These metrics are gathered by monitoring group memberships and communications patterns between Nodes that are directly connected to the New Node. Specifically, when Nodes leave an erstwhile common group or when conversations stop between nodes after the New Node engages, it can be determined which inter-Links are destroyed.
6. What is the Link acceleration pattern between Nodes that are directly connected with the New Node? These metrics are gathered by monitoring group memberships and communications patterns between Nodes that are directly connected to the New Node. A healthy dialog pattern follows a slow ramp up pattern and falls into a steady, flat line with little or no acceleration (positive or negative growth in the rate of communications). An unhealthy communication pattern shows rapid acceleration patterns with quick spikes (many Links established in a short time period) and rapid fall off (Links are destroyed). The Troll Blocker Protocol looks for unhealthy communication patterns based on acceleration rates.
7. What Links are created between existing Nodes that are connected with the New Node and Nodes that are not connected with the New Node? These metrics are gathered by monitoring group memberships and communications patterns between existing Nodes that are not directly connected to the New Nodes and existing Nodes that are directly connected to the New Node. Links are formed either by existing Nodes joining new common groups or through new conversation streams, either within a group or through direct messaging on the SMP.
8. What Links are destroyed between existing Nodes that are connected with the New Node and existing Nodes that are not connected with the New Node? These metrics are gathered by monitoring group memberships and communications patterns between existing Nodes that are not directly connected to the New Nodes and existing Nodes that are directly connected to the New Node. Links are destroyed when existing Nodes leave a common group or when communications—direct or within a common group—stop between the existing Nodes.
9. What is the Link acceleration pattern between existing Nodes that are connected with the New Node and existing Nodes that are not connected with the New Node? These metrics are gathered by monitoring group memberships and communications patterns between existing Nodes that are not directly connected to the New Nodes and existing Nodes that are directly connected to the New Node. A healthy dialog pattern follows a slow ramp up pattern and falls into a steady, flat line with no or little acceleration (positive or negative growth in the rate of communications). An unhealthy communication pattern shows rapid acceleration patterns with quick spikes (many Links established in a short time period) and rapid fall off (Links are destroyed). The Troll Blocker Protocol looks for unhealthy communication patterns based on acceleration rates.
10. What is the correlation between acceleration patterns for links emanating from the New Node and other Links? We are measuring two different Link acceleration patterns: Those between the New Node and directly connected existing Nodes and those between directly connected existing Nodes to the New Nodes and other Nodes. Acceleration pattern matching is done across multiple time dimensions to understand the immediacy of the Troll's effect on the SMP's networks.
11. What is the sentiment of each Link emanating from the New Node? Is it positive or negative? Using Natural Language Processing (NLP), media streams (voice, video, and text) are analyzed to determine the Link's sentiment. When analyzed over time, the sentiment trend reveal the health of the relationship between two Nodes.
12. What is the sentiment of each Link not emanating from the New Node when those links are correlated with Links created from the New Node? This is the same technique as that described in item 11 but the analysis scope excludes the New Node to provide comparative metrics.
13. What is the SMP time for the New Node and how does it change over time? This is measured by monitoring total SMP system time by the New Node over time.
14. What is the SMP time for each Node connected with the New Node and how does it change over time? This is measured by monitoring total SMP system time by existing Nodes directly connected to the New Node over time.
15. What is the SMP time for each Node connected to a Node that is directly connected to the New Node and how does it change over time? This is measured by monitoring total SMP system time by existing Nodes connected to other existing Nodes that are directly connected to the New Node over time.
16. What SMP features are used by the New Node and how does that feature usage change over time? This is measured by monitoring total SMP feature usage by the New Node over time.
17. Which SMP features are used by each existing Node connected to the New Node and how does that feature usage change over time? This is measured by monitoring total SMP feature usage by existing Nodes directly connected to the New Node over time.
18. What SMP features are used by each existing Node connected to an existing Node that is directly connected to the New Node and how does that feature usage change over time? This is measured by monitoring total SMP feature usage by monitoring total SMP system time by existing Nodes connected to other existing Nodes that are directed connected to the New Node over time.

As the Monitor builds the database for each New Nodes, the Identifier goes to work to create Troll fingerprints where they might exist.

The Identifier

The identifier contains a list of definitions against which a troll's fingerprints are matched. The identifier's feature is that it is not a simple, linear dictionary; rather, it is a system that relates different actions together, all of which may be benign but, together become corrosive.

The Identifier uses Machine Learning (ML) to correlate how the factors, as detected, described, and recorded by the monitor, in a manner to fingerprint the Troll. The Identifier's ML algorithm correlates actions directly emanating from the New Node to the interactions of other Nodes and pays special attention to Node inter-Links in the correct time-sequence to detect cause-and-effect situations.

With cause-and-effect detected, the Identifier then focuses on change in sentiment from positive to negative, the accelerated rate of conversations from low to high, and SMP time and feature usage patterns from higher to lower values, to authoritatively fingerprint the Troll.

With the troll identified by the Identifier, the system then moves to determine the "trolliness" of the troll, or the grade of the troll.

The Grader

The Grader has a built-in and updatable library where an arbitrary number of troll grades can be described. Troll grades range, for example, from 1 to 10, with grades being relative to the platform. For instance, a grade 3 on SMP A does not necessarily describe the same level of "trollness" as a grade 3 on SMP B. As such, troll grades are determined by how an SMP node behaves relative to the entire population. All SMP nodes are, at one point or another, "new." When the TBP (Troll Blocker Protocol) is first introduced to an SMP, all nodes are deemed as "new." As such the behavior of all nodes is analyzed. As new nodes join the SMP, their behaviors are also analyzed. The total set of behaviors is then stack-ranked and put in a spectrum. That spectrum is then subdivided into, e.g., ten different groups, each group receiving a grade of 1 through 10. The spectrum is not necessarily linear, meaning it not necessarily the case that the spectrum is an even division of the population into 10 equal segments.

The spectrum is subdivided based on the extremeness of "trollness," and that extremeness is measured by the negative effects of the troll on the rest of the SMP nodes. As such, if a highly pernicious nodes joins the SMP as a new node, over time, that new node will redefine what a grade 10 means for that particular SMP and will force a re-ranking of grades 1 through 9. At this point of the flow, the troll has been fingerprinted and given a grade. That grade determines how the Delimiter influences the troll's user experience retardants (UXRs).

The Delimiter

The delimiter injects UXRs through existing SMP APIs in proportion to the troll's grade. The Delimiter matches the troll's grade from with options recommended by the Retardant Library to discourage the troll from using the SMP in proportion to the troll's grade.

Retardant Library

The Retardant Library has a list of human-defined limitations, such as:
  Injecting typographical errors in the user's keyboard stream. This is achieved by having a keyboard abstraction layer within the mobile app that serves to slow-down the keyboard input rate while randomly injecting errors within the text stream at a rate that is proportional to the troll's grade.
  Making the smart phone's touch screen less responsive. This is achieved by having a screen abstraction layer within the mobile app that serves to slowdown gesture input rate while randomly injecting errors at a rate that is proportional to the troll's grade.
  Injecting a long wait cycle at user log-in; this is done through a "Wait" routine within the app that shows a spinning icon when the user logs in. The duration of the "Wait" routine is commensurate with the troll's grade.
  Forcing application crashes with some frequency. This is done through a "Kill" routine within the app. The "Kill routine is invoked randomly at a rate that is commensurate with the troll's grade.

Each action has a range from 1 through 3 corresponding to "light," "medium," and "heavy." Effectively, each range grade is defined by a real number range between 0 and 1, where the real number corresponds to a probability that an action from the Retardant Library would be used against the troll at any given time when the troll is using the SMP. It is possible for the ranges of 1, 2, and 3 to overlap; for instance, a higher end of 1's range may overlap with the lower part of 2's range, and so forth. The probability ranges of 1, 2, and 3 are determined per SMP and may change over time depending on the nodes' behavior patterns. This is because, on a specific SMP, a set of "light" retardant actions would deter a high-scoring troll, whereas on another SMP platform, a set of "medium" retardant actions would deter a low-scoring troll. As the TBP interacts with the range of trolls on each platform, it learns and determines the right probability ranges for 1, 2, and 3 for the population of nodes on the SMP per their behavioral proclivity.

The intent of the TBP is to ensure that a few bad apples do not spoil the entire barrel. In this case, a few bad apples are the trolls. The entire barrel of apples is the rest of the SMP nodes. Because a few bad actors in any population can ruin the experience of the entire population, it becomes necessary to systematically, programmatically, and automatically make it progressively harder for the trolls to function with the SMP as the troll's behavior becomes more egregious. However, it must be understood that a "troll" on one SMP is not necessarily a "troll" on another SMP, meaning that "troll behavior" is defined relatively to the broader SMP population. And "troll behavior" is only understood by measure the effects of a potential troll's behavior on other relationships within the SMP. Likewise, what would be sufficient to deter a troll on one SMP may not suffice for another troll on another SMP. As such, the severity of response to the troll is determines by both the "culture" of the SMP and the sensitivity of the troll to negative system feedback (in terms of making the system more difficult to use). This is why the TBP defines both trolls and the response to the trolls relative to the general population within which the troll exists. But, the overall effect of the TBP is to protect the larger SMP population from the adverse effects of a few nodes.

As TBP exerts more limitations on the troll's system usage, the troll learns that he has three options: (1) stop interacting with the system; (2) limit interacting with the system; or 3) modify behavior. If the troll stops interacting with the system, TBP has met its objective by having the troll voluntarily remove himself from the SMP. As the system experience becomes poor for the troll, he may throttle back his activities, some of which are those that earn him the troll label. Because of reduced (trolling) activity, the system will decrease the troll's grade over time, making the system more open and usable to the troll. Again, in this scenario, TBP achieves its objectives by leading the troll to display a less "trolly" behavior. And, if the happy advent of the troll recognizing that his trolling behavior is correlated with SMP usage difficulty, he will then have the motivation to modify his behavior. Again, here, TBP has achieved its objective of motivating behavior change for the better.

Figure 4:
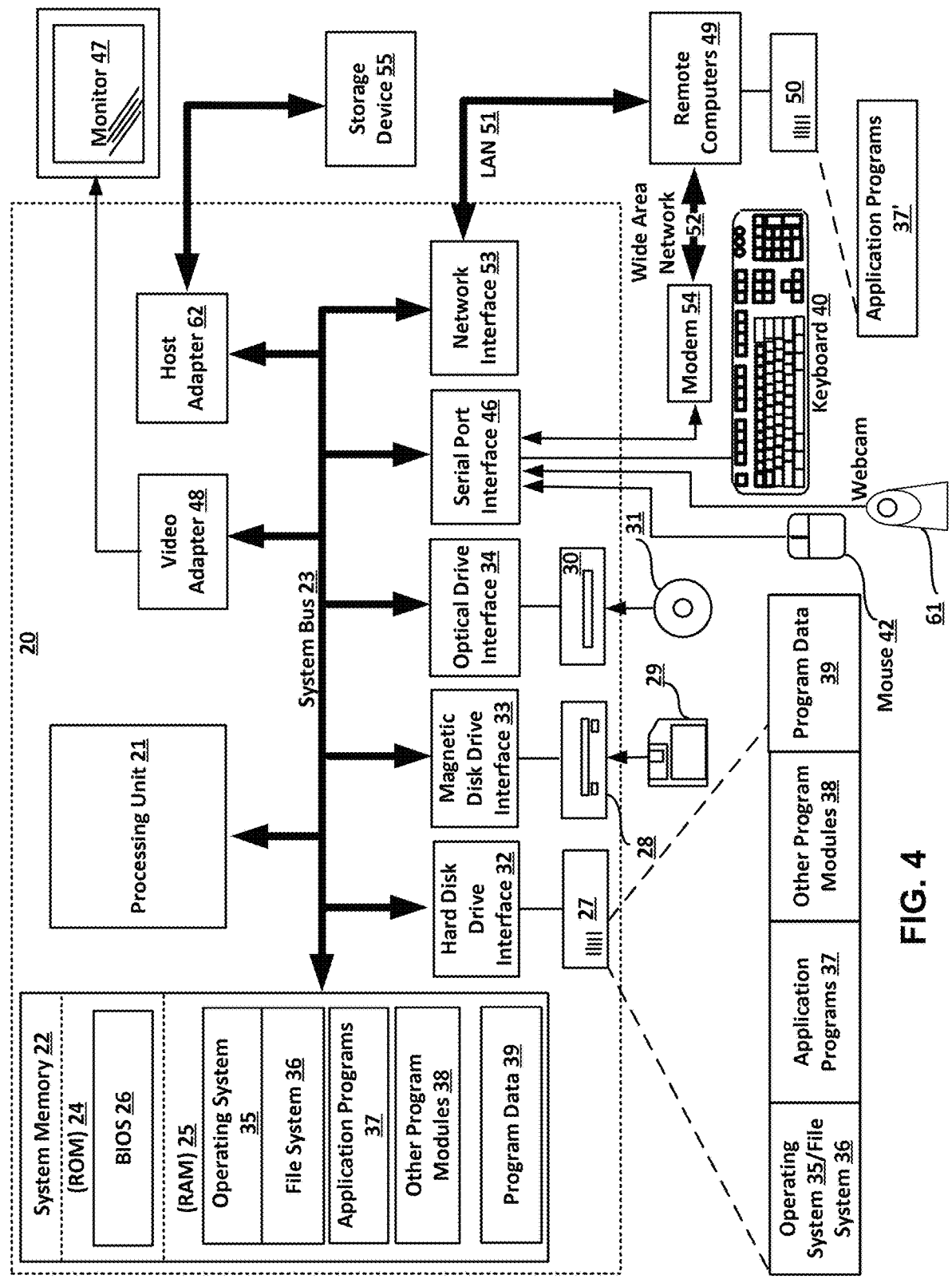
FIG. 4 shows a computer system or server that may be used to implement the invention.

With reference to FIG. 4, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar) The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40, a webcam 61 and pointing device (e.g., a mouse) 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 62 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A system for identifying and blocking trolls on social networks, the system comprising:
   a processor;
   an identifier module continuously scanning a social media platform (SMP) to detect that a user of the SMP is a troll;
   a monitor module including a list of definitions against which the troll's fingerprints are matched, wherein the list of definitions contains patterns of conversations among multiple users on the SMP, and wherein the fingerprints include message contents and evolution of a conversation involving the message contents;
   a grader module assigning a trollness grade to the troll;
   a delimiter module injecting user experience retardants (UXRs) through an Application Programming Interface of the SMP based on the trollness grade from the grader module,
   wherein the UXRs degrade an experience of the troll with the SMP by injecting typographical errors in the user's keyboard stream with a keyboard abstraction layer within a mobile application of the SMP to slow down a keyboard input rate; and
   a retardant library including a list of human-defined UXRs,
   wherein the identifier module, the monitor module and the grader module are software components running on the processor.

2. The system of claim 1, wherein the UXRs includes injecting a long wait cycle at user log-in through a Wait routine within the mobile application of the SMP showing a spinning icon when the user logs in.

3. The system of claim 1, wherein the monitor module includes any of the following:
   a. SMP new entrants (New Node) detector;
   b. New Nodes communications (Links) with existing SMP members (Nodes) detector;
   c. detector of intra-Links between Nodes connected with the New Node;
   d. detector of links between the Nodes connected with the New Node and Nodes not connected with the New Node;
   e. Link sentiment measurement;
   f. New Node SMP time;
   g. New Node SMP feature usage;
   h. Node SMP time; and
   i. Node SMP feature usage.

4. The system of claim 1, wherein, when a New Node corresponding to a new entrant appears in the SMP, the monitor module looks for any of the following:
   (a) what new Links were established between the New Node and existing Nodes;
   (b) what is Link acceleration pattern;
   (c) which Links are destroyed (all communications cease) between the New Node and other Nodes;
   (d) what inter-Links are established between Nodes directly connected with the New Node;
   (e) what inter-Links are destroyed between Nodes directly connected with the New Node.

5. The system of claim 1, wherein, when a New Node corresponding to a new entrant appears in the SMP, the monitor module looks for any of the following:
   (a) what is a Link acceleration pattern between Nodes directly connected with the New Node;
   (b) what Links are created between existing Nodes connected with the New Node and Nodes not connected with the New Node;
   (c) what Links are destroyed between existing Nodes connected with the New Node and existing Nodes not connected with the New Node;
   (d) what is Link acceleration pattern between existing Nodes connected with the New Node and existing Nodes not connected with the New Node?
   (e) what is a correlation between acceleration patterns for links emanating from the New Node and other Links;
   (f) what is a sentiment of each Link emanating from the New Node;
   (g) what is sentiment of each Link not emanating from the New Node when the each Link is correlated with Links created from the New Node.

6. The system of claim 1, wherein, when a New Node corresponding to a new entrant appears in the SMP, the monitor module looks for any of the following:
   (a) what is first SMP usage time for the New Node and how does the first SMP usage time change over time;
   (b) what is second SMP usage time for each Node connected with the New Node and how does the second SMP usage time change over time;
   (c) what is third SMP usage time for each Node connected to a Node directly connected to the New Node and how does the third SMP usage time change over time;
   (d) what first SMP features are used by the New Node and how does the first SMP features usage change over time;
   (e) which second SMP features are used by each existing Node connected to the New Node and how does the second SMP features usage change over time;
   (f) what third SMP features are used by each existing Node connected to an existing Node directly connected to the New Node and how does the third SMP features usage change over time.

7. The system of claim 1, wherein, when a New Node corresponding to a new entrant appears in the SMP, the monitor module looks for a Link acceleration pattern.

8. The system of claim 7, wherein, as part of the Link acceleration pattern, the monitor module analyzes
   (a) what Links are created between existing Nodes connected with the New Node and Nodes not connected with the New Node;
   (b) what Links are destroyed between existing Nodes connected with the New Node and existing Nodes not connected with the New Node;
   (c) what is Link acceleration pattern between existing Nodes connected with the New Node and existing Nodes not connected with the New Node;
   (d) what is a correlation between acceleration patterns for links emanating from the New Node and other Links.

9. The system of claim 1, wherein, when a New Node corresponding to a new entrant appears in the SMP, the monitor module considers SMP usage time for the New Node and how the SMP usage time changes over time.

10. The system of claim 1, wherein, when a New Node corresponding to a new entrant appears in the SMP, the monitor module considers SMP usage time for each Node connected with the New Node and how the SMP usage time changes over time.

11. The system of claim 1, wherein, when a New Node corresponding to a new entrant appears in the SMP, the monitor module considers SMP usage time for each Node connected to a Node directly connected to the New Node and how the SMP usage time changes over time.

12. The system of claim 1, wherein, when a New Node corresponding to a new entrant appears in the SMP, the monitor module considers which SMP features are used by each existing Node connected to the New Node and how the SMP features usage changes over time.

13. The system of claim 1, wherein, when a New Node corresponding to a new entrant appears in the SMP, the monitor module considers which SMP features are used by each existing Node connected to an existing Node directly connected to the New Node and how the SMP features usage changes over time.

14. A system for identifying and blocking trolls on social networks, the system comprising:
a processor;
an identifier module continuously scanning a social media platform (SMP) to detect that a user of the SMP is a troll;
a monitor module including a list of definitions against which the troll's fingerprints are matched, wherein the list of definitions contains patterns of conversations among multiple users on the SMP, and wherein the fingerprints include message contents and evolution of a conversation involving the message contents;
a grader module assigning a trollness grade to the troll;
a delimiter module injecting user experience retardants (UXRs) through an Application Programming Interface of the SMP based on the trollness grade from the grader module,
wherein the UXRs degrade an experience of the troll with the SMP by making a touch screen of the user's mobile device less responsive by having a screen abstraction layer within a mobile application of the SMP and randomly inject errors; and
a retardant library including a list of human-defined UXRs,
wherein the identifier module, the monitor module and the grader module are software components running on the processor.

15. A system for identifying and blocking trolls on social networks, the system comprising:
a processor;
an identifier module continuously scanning a social media platform (SMP) to detect that a user of the SMP is a troll;
a monitor module including a list of definitions against which the troll's fingerprints are matched, wherein the list of definitions contains patterns of conversations among multiple users on the SMP, and wherein the fingerprints include message contents and evolution of a conversation involving the message contents;
a grader module assigning a trollness grade to the troll;
a delimiter module injecting user experience retardants (UXRs) through an Application Programming Interface of the SMP based on the trollness grade from the grader module,
wherein the UXRs degrade an experience of the troll with the SMP by injecting a long wait cycle at user log-in through a Wait routine within a mobile application of the SMP showing a spinning icon when the user logs in; and
a retardant library including a list of human-defined UXRs,
wherein the identifier module, the monitor module and the grader module are software components running on the processor,
wherein, in the grader module, when a New Node joins the SMP, a total set of behaviors is stack-ranked and put in a spectrum of trollness based measured by negative effects of the troll on other SMP nodes.

16. A method for identifying and blocking trolls on social networks, the method comprising:
on a processor, continuously scanning a social media platform (SMP) to detect that a user of the SMP is a troll;
matching the troll's fingerprints against a list of definitions, wherein the list of definitions contains patterns of conversations among multiple users on the SMP, and wherein the fingerprints include message contents and evolution of a conversation involving the message contents;
assigning a trollness grade to the troll; and
injecting user experience retardants (UXRs) through an Application Programming Interface of the SMP based on the trollness grade from a grader module,
wherein the UXRs degrade an experience of the troll with the SMP by making a touch screen of the user's mobile device less responsive by having a screen abstraction layer within a mobile application of the SMP and to randomly inject errors, and
wherein the UXRs are obtained from a retardant library including a list of human-defined UXRs.

* * * * *